(12) United States Patent
Tomobe et al.

(10) Patent No.: US 10,741,887 B2
(45) Date of Patent: Aug. 11, 2020

(54) FIXING STRUCTURE OF VOLTAGE DETECTION TERMINAL

(71) Applicant: Yazaki Corporation, Tokyo (JP)

(72) Inventors: Takuya Tomobe, Shizuoka (JP); Naoto Inoue, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 255 days.

(21) Appl. No.: 15/728,295

(22) Filed: Oct. 9, 2017

(65) Prior Publication Data

US 2018/0108953 A1 Apr. 19, 2018

(30) Foreign Application Priority Data

Oct. 17, 2016 (JP) .................................. 2016-203626

(51) Int. Cl.
| | |
|---|---|
| *H01M 10/48* | (2006.01) |
| *H01M 2/30* | (2006.01) |
| *H01M 2/20* | (2006.01) |
| *H01R 11/28* | (2006.01) |
| *B60L 3/00* | (2019.01) |

(Continued)

(52) U.S. Cl.
CPC ........... *H01M 10/48* (2013.01); *B60L 3/0046* (2013.01); *B60L 50/64* (2019.02); *H01M 2/1077* (2013.01); *H01M 2/206* (2013.01); *H01M 2/305* (2013.01); *H01R 9/16* (2013.01); *H01R 11/12* (2013.01); *H01R 11/288* (2013.01); *B60L 2240/547* (2013.01); *Y02T 10/7005* (2013.01); *Y02T 10/705* (2013.01)

(58) Field of Classification Search
CPC ...... H01M 10/48; H01M 2/206; H01M 2/305; H01M 2/1077; B60L 50/64; B60L 3/0046; B60L 2240/547; H01R 11/12; H01R 9/16; H01R 11/288; Y02T 10/705; Y02T 10/7005

See application file for complete search history.

(56) References Cited

U.S. PATENT DOCUMENTS

| | | | | |
|---|---|---|---|---|
| 6,146,788 | A * | 11/2000 | Ikeda | H01M 2/206 429/121 |
| 2013/0280959 | A1* | 10/2013 | Takase | H01M 2/1077 439/627 |
| 2015/0318626 | A1 | 11/2015 | Nakayama et al. | |

FOREIGN PATENT DOCUMENTS

| | | |
|---|---|---|
| CN | 105493311 A | 4/2016 |
| JP | 2015-187910 | 10/2015 |

* cited by examiner

*Primary Examiner* — Lisa S Park
(74) *Attorney, Agent, or Firm* — Kenealy Vaidya LLP

(57) ABSTRACT

A fixing structure of voltage detection terminal includes a voltage detection terminal and a resin case having insulation property. The voltage detection terminal includes a flat plate portion, a busbar connection portion that bends from an upper end of the flat plate portion in an extending direction perpendicular to an up-down direction, and a crimping portion connected to an end portion of an electrical wire. The resin case includes a terminal accommodating portion accommodating the voltage detection terminal. The busbar connection portion is bonded to a plane surface of a busbar in the up-down direction to overlap with the busbar. The terminal accommodating portion includes projections that block movement in the extending direction of the flat plate portion in the terminal accommodating portion, and a latch projection that blocks movement in the up-down direction of the voltage detection terminal in the terminal accommodating portion.

3 Claims, 7 Drawing Sheets

(51) Int. Cl.
*H01R 11/12* (2006.01)
*H01R 9/16* (2006.01)
*B60L 50/64* (2019.01)
*H01M 2/10* (2006.01)

FIXING STRUCTURE OF VOLTAGE DETECTION TERMINAL

CROSS-REFERENCE TO RELATED APPLICATION(S)

The present application claims priority to and incorporates by reference the entire contents of Japanese Patent Application No. 2016-203626 filed in Japan on Oct. 17, 2016.

BACKGROUND OF THE INVENTION

1. Field of the Invention

The present invention relates to a fixing structure of voltage detection terminal.

2. Description of the Related Art

Battery packs include housings and metal busbars that are fixed to electrode terminals of a plurality of battery cells housed in the housings and connect the battery cells in series and/or in parallel. In an example of such busbars, a part of a voltage detection terminal held by a resin case is bonded to a flat surface of the busbar by welding or soldering, for example (e.g., refer to Japanese Patent Application Laid-open No. 2015-187910).

When rattling occurs between the resin case and the voltage detection terminal held by the resin case, a stress occurs in a portion where the voltage detection terminal and the busbar are bonded. The rattling hinders achievement of higher electrical connection therebetween.

SUMMARY OF THE INVENTION

The invention aims to provide a simple fixing structure of voltage detection terminal that can block movement of a voltage detection terminal.

In order to achieve the above mentioned object, a fixing structure of voltage detection terminal according to one aspect of the present invention includes a voltage detection terminal that includes: a flat plate portion having a flat plate shape; an extending portion bending with respect to an upper end side in an up-down direction of the flat plate portion and extending in an extending direction perpendicular to the up-down direction; and a connection portion extending from a lower end side of the flat plate portion in an axial direction perpendicular to the up-down direction and the extending direction, and connected to an end portion of a voltage detection electrical wire; and a resin case that has insulation property and includes a terminal accommodating portion configured to accommodate the voltage detection terminal, wherein the resin case is configured to be accommodated in a housing of a battery pack to which a metal busbar is assembled, the busbar connecting electrodes of a plurality of battery cells in series or in parallel, the extending portion is configured to be bonded to a plane surface of the busbar in the up-down direction to overlap with the busbar, and electrically connected to the busbar, and the terminal accommodating portion includes: a first blocking portion configured to block movement of the flat plate portion of the voltage detection terminal in the terminal accommodating portion toward the extending direction; and a second blocking portion configured to block movement of the flat plate portion of the voltage detection terminal in the terminal accommodating portion toward the up-down direction.

According to another aspect of the present invention, in the fixing structure of voltage detection terminal, it is preferable that the first blocking portion is a pair of projections arranged in a standing manner such that the projections lock an upper end side of the flat plate portion on the terminal accommodating portion side in the extending direction, and the second blocking portion is a latch projection that is provided in a standing manner in the axial direction and latches a lower end side of the flat plate portion.

According to still another aspect of the present invention, in the fixing structure of voltage detection terminal, it is preferable that the flat plate portion includes a latch portion having an opening opening to the extending direction on the lower end side, and an inner circumferential surface of the latch portion abuts an outer circumferential surface of the latch projection at least in the up-down direction in a state where the opening of the latch portion is latched to the latch projection.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The following describes an embodiment according to the invention in detail with reference to the accompanying drawings. The invention, however, is not limited to the following embodiment. The constituent elements of the following embodiment include elements that can be easily replaced by persons skilled in the art or that are substantially the same as the elements known by those skilled in the art. Various omissions, substitutions, and changes of the constituent elements of the following embodiment described herein may be made without departing from the spirit of the invention.

Embodiment

Figure 1:
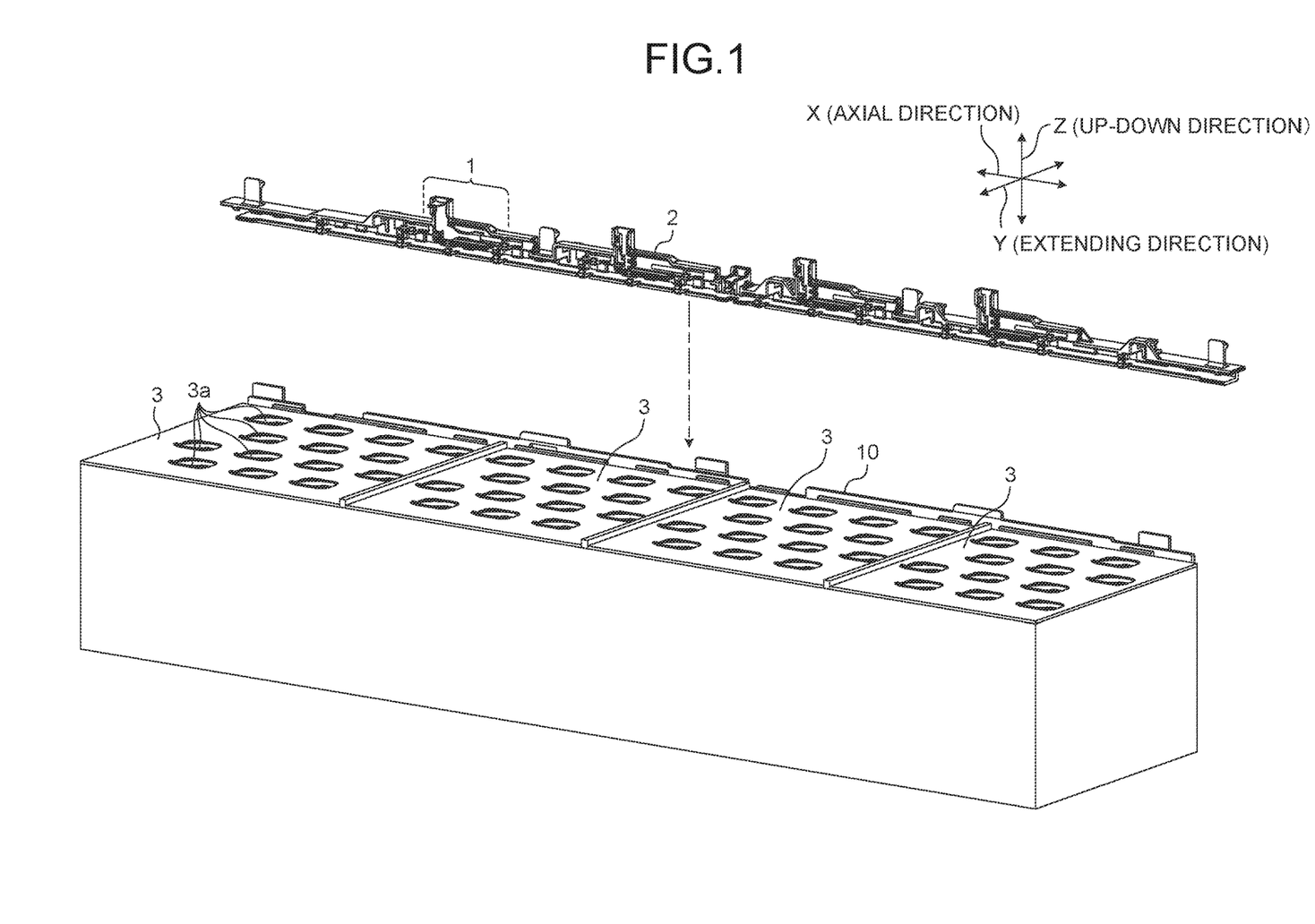
FIG. 1 is an exploded perspective view illustrating a schematic structure of a battery pack to which a fixing structure of voltage detection terminal according to an embodiment is applied.
Figure 2:
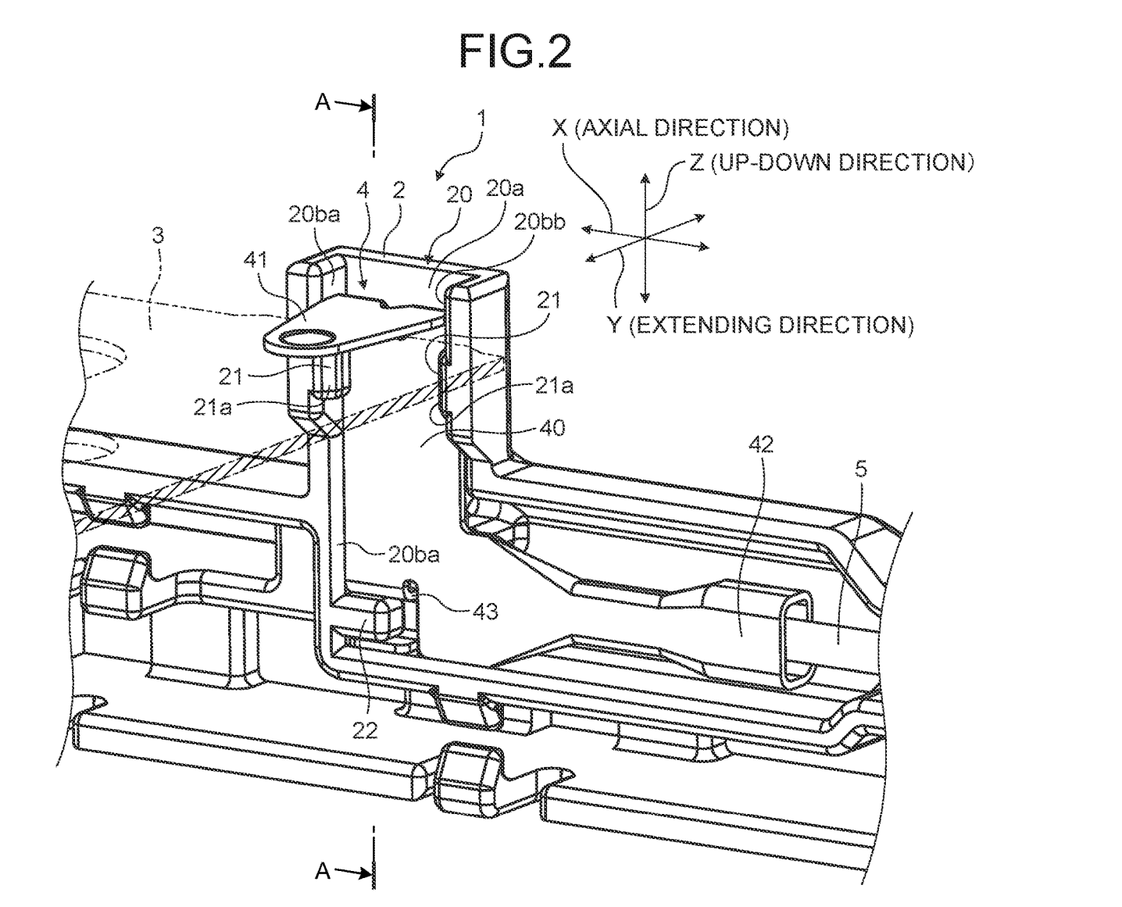
FIG. 2 is a perspective view illustrating a schematic structure of the fixing structure of voltage detection terminal according to the embodiment.
Figure 3:
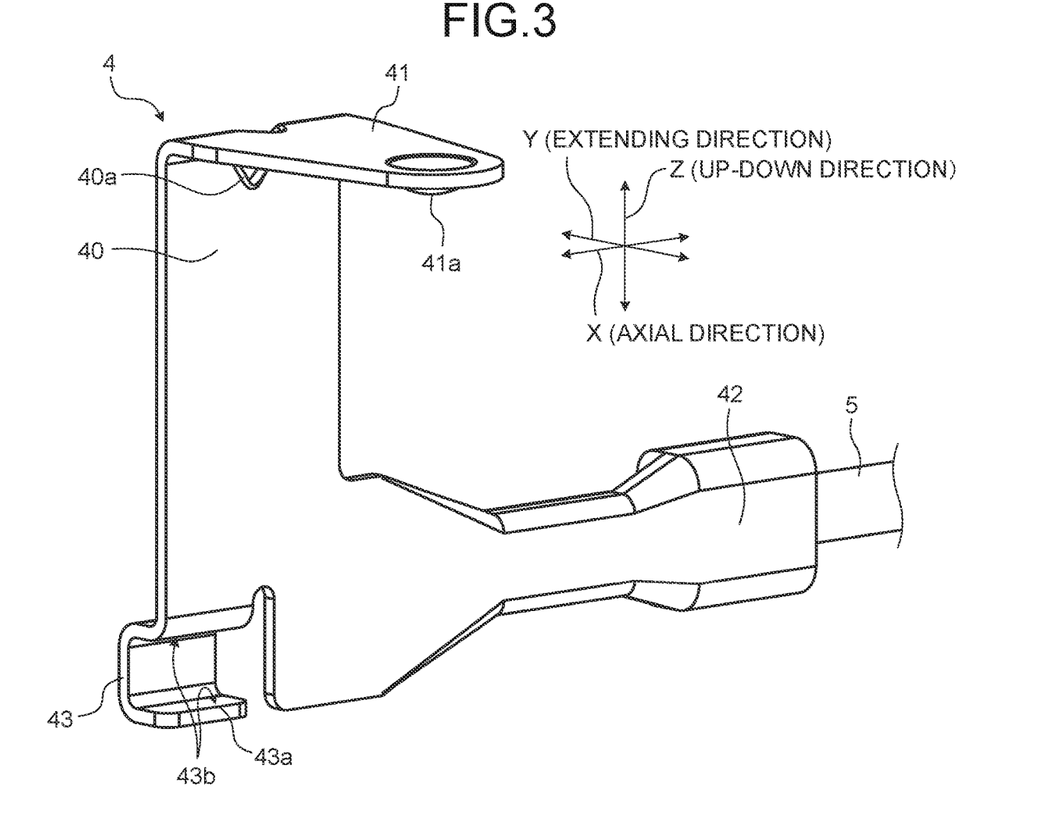
FIG. 3 is a perspective view illustrating a schematic structure of a voltage detection terminal in the embodiment.
Figure 4:
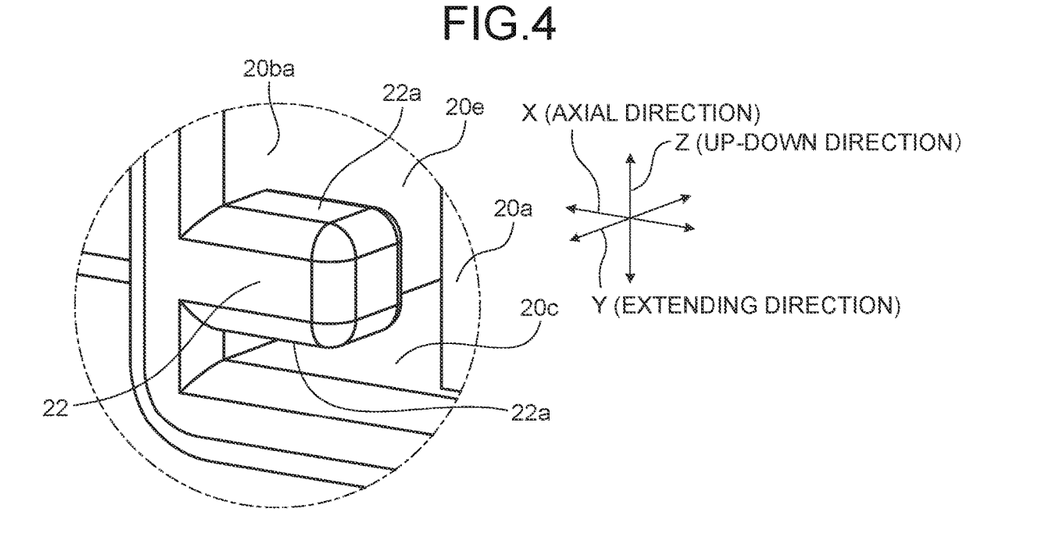
FIG. 4 is a partially enlarged view illustrating a schematic structure of a latch projection in the embodiment.
Figure 5:
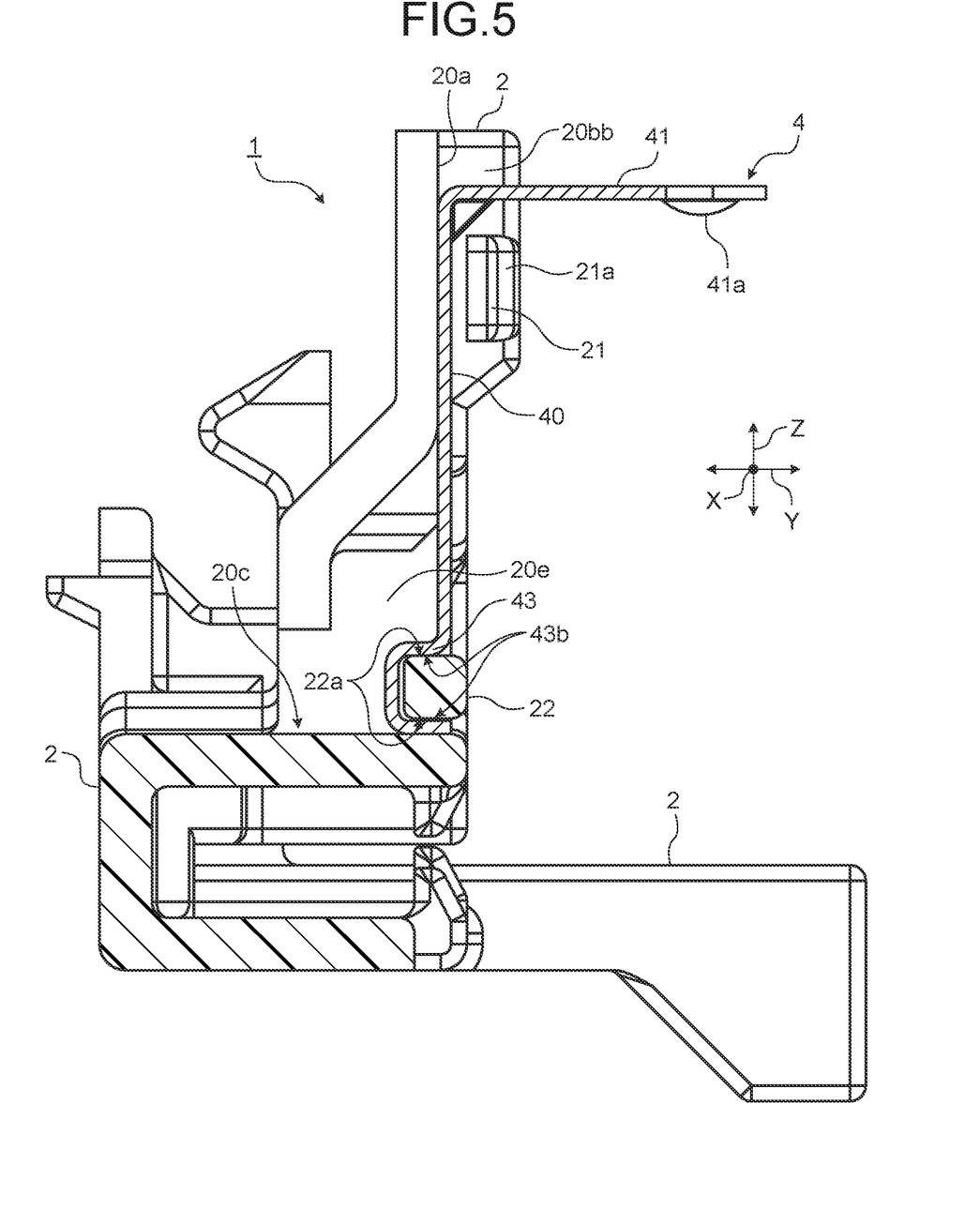
FIG. 5 is a longitudinal sectional view illustrating a schematic structure of the fixing structure of voltage detection terminal according to the embodiment.
Figure 6:
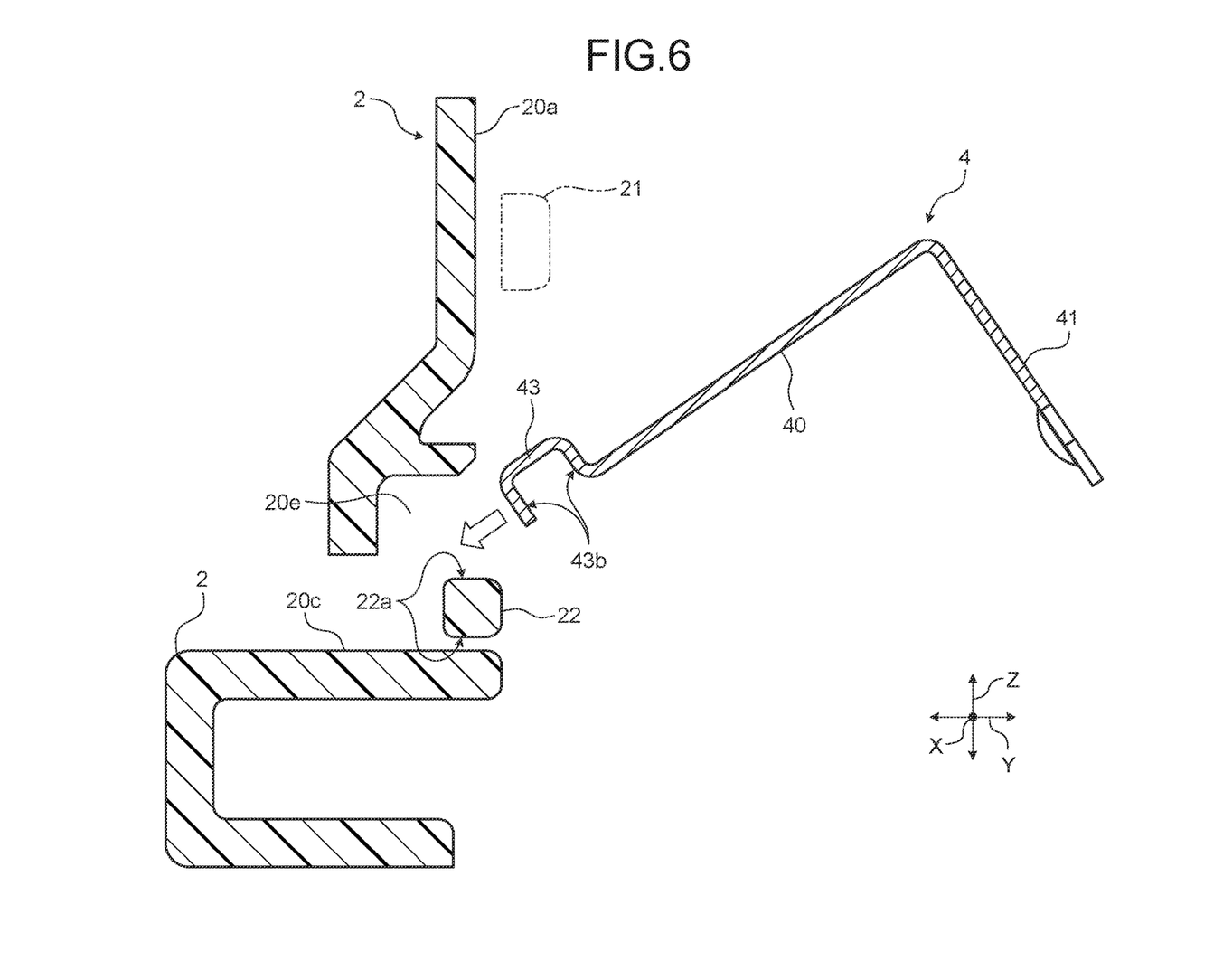
FIG. 6 is a schematic diagram illustrating a first stage in a method for fixing the voltage detection terminal in the embodiment.
Figure 7:
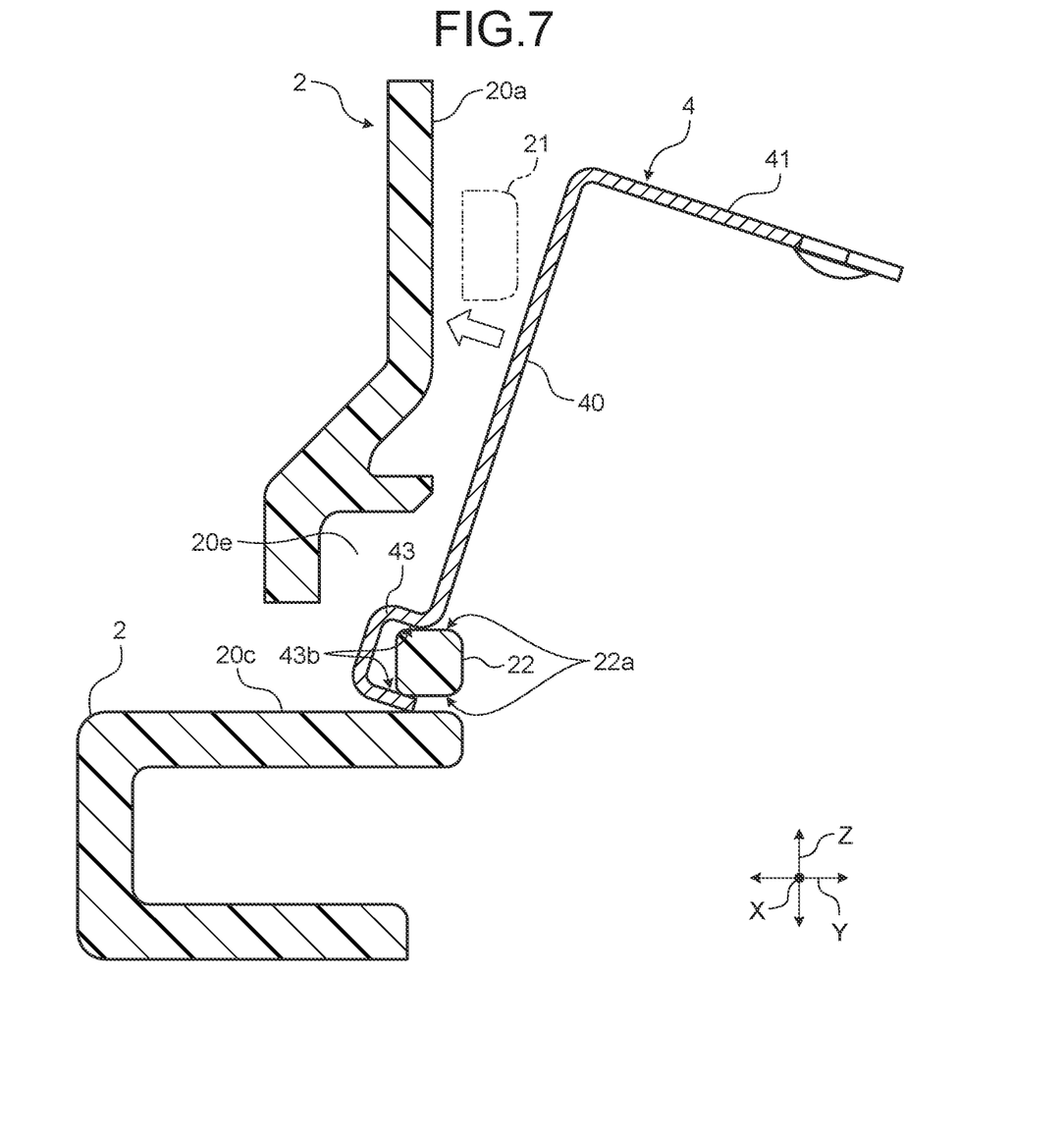
FIG. 7 is a schematic diagram illustrating a second stage in the method for fixing the voltage detection terminal in the embodiment.
Figure 8:
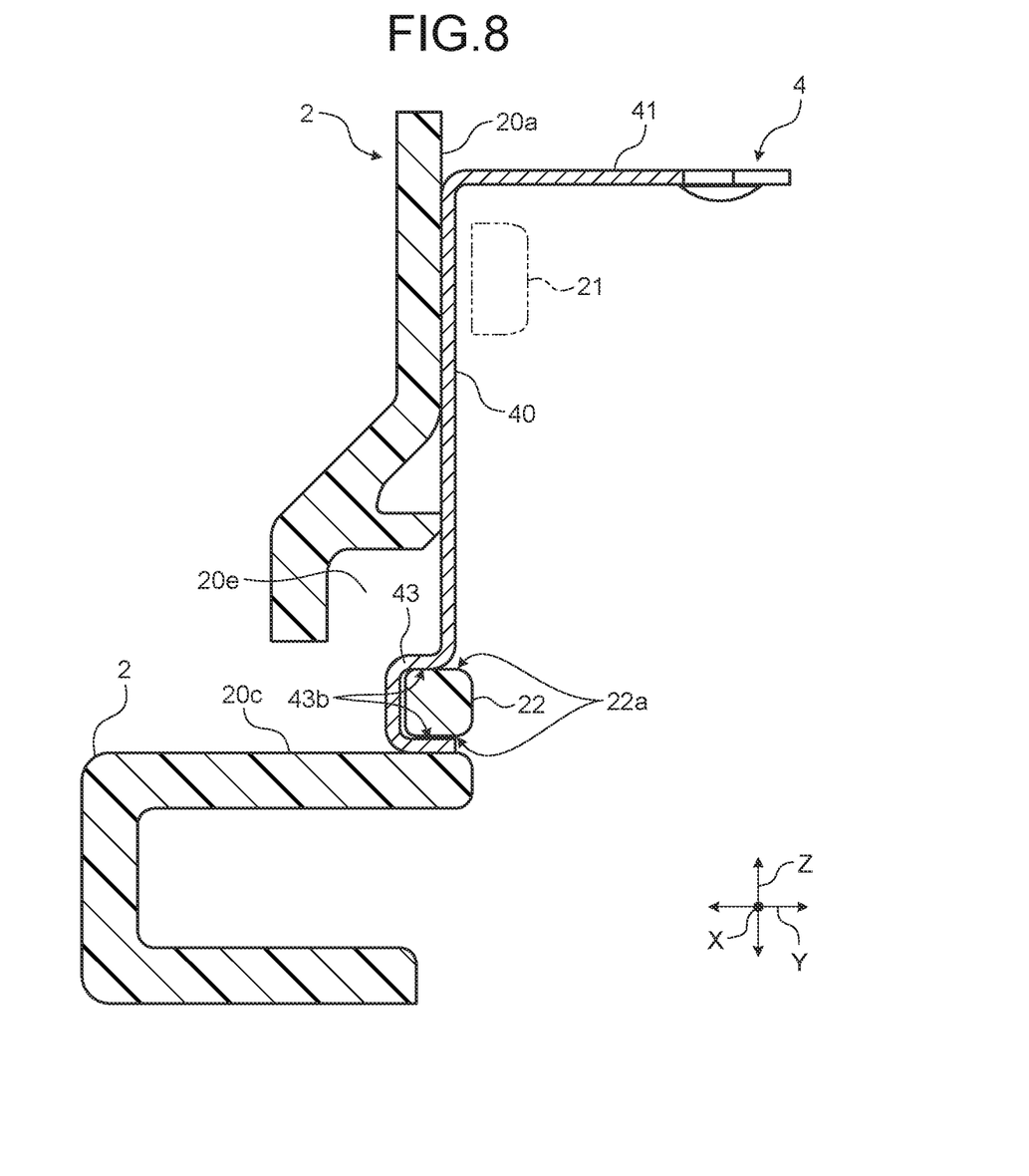
FIG. 8 is a schematic diagram illustrating a third stage in the method for fixing the voltage detection terminal in the embodiment.

With reference to FIGS. 1 to 8, the following describes a fixing structure of voltage detection terminal according to the embodiment. FIG. 1 is an exploded perspective view illustrating a schematic structure of a battery pack to which the fixing structure of voltage detection terminal according to the embodiment is applied. FIG. 2 is a perspective view illustrating a schematic structure of the fixing structure of voltage detection terminal according to the embodiment. FIG. 3 is a perspective view illustrating a schematic structure of a voltage detection terminal in the embodiment. FIG. 4 is a partially enlarged view illustrating a schematic structure of a latch projection in embodiment. FIG. 5 is a longitudinal sectional view illustrating a schematic structure of the fixing structure of voltage detection terminal according to the embodiment. FIGS. 6 to 8 are schematic diagrams illustrating stages of a method for fixing the voltage detection terminal in the embodiment. FIG. 5 is a sectional view along line A-A of FIG. 2. FIG. 6 illustrates a state where the voltage detection terminal is inserted first from a latch portion thereof into an insertion space in a terminal accommodating portion. FIG. 7 illustrates a state where the voltage detection terminal is going to be latched to projections while the latch portion thereof is being latched to the latch projection in the terminal accommodating portion. FIG. 8 illustrates a state where the latch portion of the voltage detection terminal is latched to the latch projection, and a flat plate portion of the voltage detection terminal is latched to the projections, resulting in the voltage detection terminal being assembled to the terminal accommodating portion.

In the following description, a direction in which a flat plate portion 40 of a voltage detection terminal 4 extends is described as an "up-down direction", an upper side of the flat plate portion 40 is described as the "upper side" in the up-down direction, and a lower side of the flat plate portion 40 is described as the "lower side" in the up-down direction in some cases. A planer direction perpendicular to the up-down direction, in which a busbar connection portion 41 of the voltage detection terminal 4 extends, is described as an "extending direction", a leading end side of the busbar connection portion 41 is described as the leading end side in the extending direction, and a base end side of the busbar connection portion 41 is described as the base end side in the extending direction in some cases. A direction perpendicular to the extending direction, i.e., the direction from a crimping portion 42 of the voltage detection terminal 4 to an electrical wire 5, is described as an "axial direction" in some cases. The up-down direction is not limited to the vertical direction. The upper side and the lower side in the up-down direction do not necessarily correspond to those in the vertical direction.

A fixing structure of voltage detection terminal 1 according to the embodiment is applied to a resin case 2 assembled to a housing 10 of a battery pack mounted on a vehicle such as an electric vehicle (EV), a hybrid electric vehicle (HEV), or a plug-in hybrid electric vehicle (PHEV), for example. To the housing 10 of the battery pack, a plurality of busbars 3 are assembled. The busbar 3 is made of a metal material having conductivity and a plate shape. A part of a horizontal surface of the busbar 3 is bent according to a shape of the housing 10. The busbar 3 connects electrodes of the multiple battery cells in series or in parallel. The busbar 3 has a plurality of through holes 3a corresponding to the respective battery cells. The through holes 3a are formed by stamping such that portions connecting to the respective battery cells remain on the busbar 3 after the stamping. The housing 10 includes at least cylindrical housing units each accommodating one of the battery cells and a housing unit accommodating the resin case 2.

Specifically, as illustrated in FIG. 2, the fixing structure of voltage detection terminal 1 includes the voltage detection terminal 4 and the resin case 2 that accommodates and fixes the voltage detection terminal 4.

The voltage detection terminal 4 is electrically and physically connected to the busbar 3 and the electrical wire 5. The voltage detection terminal 4 means any terminal that connects the busbar 3 with the electrical wire 5 so as to detect voltages of the battery cells accommodated in the battery pack. The voltage detection terminal 4 is made of a metal material having conductivity and a plate shape. The voltage detection terminal 4 is formed in an L-shape when viewed from the extending direction. The voltage detection terminal 4 includes the flat plate portion 40, the busbar connection portion 41, and the crimping portion 42.

The flat plate portion 40 included in the voltage detection terminal 4 has a flat plate shape and extends in the up-down direction. To the upper end of the flat plate portion 40, the busbar connection portion 41 is joined. The flat plate portion 40 has a reinforcement rib 40a that is formed between the flat plate portion 40 and the busbar connection portion 41 and reinforces the busbar connection portion 41. The reinforcement rib 40a increases strength in the up-down direction of the busbar connection portion 41, which is bent from the flat plate portion 40 in the planer direction. The flat plate portion 40 has a latch portion 43 on the lower end side thereof. The latch portion 43 is formed in a U-shape (or a reversed C-shape) and has an opening 43a which is opening to the extending direction. The opening 43a is formed such that the width in the up-down direction thereof is larger than the width in the up-down direction of a latch projection 22, which is described later. The latch portion 43 is latched to the latch projection 22 formed on a terminal accommodating portion 20 formed in the resin case 2. As illustrated in FIGS. 2 and 3, the latch portion 43 in the embodiment is latched to the latch projection 22, thereby blocking movement in the up-down direction of the flat plate portion 40 of the voltage detection terminal 4 in the terminal accommodating portion 20. Specifically, in a state where the latch portion 43 is latched to the latch projection 22, an inner circumferential surface 43b in the up-down direction of the latch portion 43 abuts the latch projection 22, thereby blocking the movement in the up-down direction of the flat plate portion 40 of the voltage detection terminal 4 in the terminal accommodating portion 20.

The busbar connection portion 41, which is the extending portion, bends from the upper end of the flat plate portion 40 in the planer direction perpendicular to the up-down direction, and extends in the extending direction. The busbar connection portion 41 is bonded to a plane surface of the busbar 3 in the up-down direction to overlap with the busbar 3, and is electrically connected to the busbar 3. The busbar connection portion 41 has a bonding portion 41a on the end portion thereof in the extending direction. The bonding portion 41a has a dome shape bulging on the lower side in the up-down direction, and is bonded to the plane surface of the busbar 3 by resistance welding, for example.

The crimping portion 42, which is the connection portion, extends from the flat plate portion 40 in the axial direction. The crimping portion 42 is caulked and crimped to the end portion of the electrical wire 5, and is electrically connected to the electrical wire 5. The crimping portion 42 is formed such that the crimping portion 42 faces a back surface 20a of the terminal accommodating portion 20 in a state where the voltage detection terminal 4 is accommodated in the terminal accommodating portion 20.

The electrical wire 5 is a voltage detection electrical wire. The electrical wire 5 is composed of a conductive core wire formed of a plurality of wires (not illustrated), and an insulating coating portion covering the outer circumference side of the wires. The electrical wire 5 is routed along a longitudinal direction in the resin case 2. The electrical wire 5 is electrically connected to a voltage detection circuit (not illustrated) that detects voltages of a plurality of battery cells accommodated in the battery pack.

The resin case 2 is formed of a resin having insulation property in a lengthy shape as a whole to fit with the shape along the longitudinal direction of the housing 10. As illustrated in FIG. 1, the resin case 2 is assembled to the housing 10 from above the housing 10 along the longitudinal direction of the housing 10, i.e., along the axial direction. The resin case 2 includes a plurality of terminal accommodating portions 20 each accommodating the voltage detection terminal 4.

The terminal accommodating portion 20 is formed in an L-shape when viewed from the extending direction so as to fit with the shape of the voltage detection terminal 4 accommodated therein. The terminal accommodating portion 20 includes the back surface 20a, side surfaces 20ba and 20bb paired with each other, a bottom surface 20c, an insertion space 20e, a pair of projections 21, and the latch projection 22. The back surface 20a blocks the flat plate portion 40 and the crimping portion 42 of the voltage detection terminal 4 in the terminal accommodating portion 20 from moving toward the base end side in the extending direction. The side surfaces 20ba and 20bb are formed such that they face each other in the axial direction with the back surface 20a interposed therebetween. The side surfaces 20ba and 20bb block the flat plate portion 40 of the voltage detection terminal 4 in the terminal accommodating portion 20 from moving in the axial direction. The bottom surface 20c is formed from the lower end of the back surface 20a in the extending direction. The bottom surface 20c blocks the flat plate portion 40 of the voltage detection terminal 4 in the terminal accommodating portion 20 from moving toward the lower side in the up-down direction. The insertion space 20e is provided in a part of the back surface 20a as an escape space for facilitating the accommodating of the voltage detection terminal 4 in the terminal accommodating portion 20.

The pair of projections 21 is the first blocking portion. The projections 21 are arranged in a standing manner such that they lock the upper end side of the flat plate portion 40 on the terminal accommodating portion 20 side in the extending direction. The respective projections 21 are arranged in a standing manner on the side surfaces 20ba and 20bb at positions facing each other in the axial direction. For each of the projections 21, a clearance is provided between the projection 21 and the back surface 20a in the extending direction so as to allow the flat plate portion 40 to be interposed in the clearance. The clearance is formed such that the distance of the clearance is equal to or larger than the thickness of the flat plate portion 40. Each projection 21 has a curved surface 21a that guides the flat plate portion 40 from the leading end side toward the base end side in the extending direction. The two curved surfaces 21a are formed to be curved in such a manner that they are gradually apart from each other in the axial direction, i.e., the height direction of the projection 21 as they proceed from the base end side toward the leading end side in the extending direction.

The latch projection 22 is the second blocking portion. The latch projection 22 is provided in a standing manner in the axial direction and latches the lower end side of the flat plate portion 40. As illustrated in FIG. 4, the latch projection 22 is provided on the side surface 20ba in a standing manner on the lower side in the up-down direction. The latch projection 22 is formed in a substantially square prism shape, and has outer circumferential surfaces 22a facing opposite directions in the up-down direction on its outer circumferential surface. The latch projection 22 is formed such that the outer circumferential surface 22a on the lower side in the up-down direction and the bottom surface 20c are apart from each other with a distance equal to or larger than the thickness of the flat plate forming the latch portion 43. The latch projection 22 is formed such that the width in the up-down direction of the latch projection 22 is smaller than the width in the up-down direction of the opening 43a of the latch portion 43. Specifically, in a state where the latch projection 22 latches the opening 43a of the latch portion 43, the inner circumferential surface 43b of the latch portion 43 abuts the outer circumferential surface 22a of the latch projection 22 in the up-down direction. The latch projection 22, thus, blocks the movement in the up-down direction of the flat plate portion 40 of the voltage detection terminal 4 in the terminal accommodating portion 20.

With reference to FIGS. 6 to 8, the following describes a work for fixing the voltage detection terminal 4 (a method for fixing the voltage detection terminal 4) to the terminal accommodating portion 20. In a first stage as illustrated in FIG. 6, the voltage detection terminal 4 is tilted with respect to the extending direction and the latch portion 43 is first inserted into the insertion space 20e. In a second stage as illustrated in FIG. 7, the voltage detection terminal 4 is being moved close to the back surface 20a such that the tilted flat plate portion 40 is raised with respect to the extending direction while the opening 43a of the latch portion 43 is being latched to the latch projection 22. In a third stage, i.e., final stage, as illustrated in FIG. 8, the flat plate portion 40 is pushed toward the back surface 20a while being guided by the curved surfaces 21a of the projections 21. As a result, the flat plate portion 40 is locked by the projections 21. In this way, the flat plate portion 40 is latched to the projections 21 while the latch portion 43 is being latched to the latch projection 22, thereby making it possible to fix the voltage detection terminal 4 to the terminal accommodating portion 20 in a continuous work. As a result, work efficiency can be increased in assembling the voltage detection terminal 4 to the resin case 2.

In the fixing structure of voltage detection terminal 1, the terminal accommodating portion 20 includes the pair of projections 21 that block the movement in the extending direction of the flat plate portion 40 of the voltage detection terminal 4 in the terminal accommodating portion 20, and the latch projection 22 that blocks the movement in the up-down direction of the flat plate portion 40 of the voltage detection terminal 4 in the terminal accommodating portion 20. This simple structure, thus, can reduce rattling of the voltage detection terminal 4 in the up-down direction even when the voltage detection terminal 4 is bonded to the busbar 3 in the up-down direction, thereby making it possible to block the movement of the voltage detection terminal 4. This structure blocks the movement in the extending direction of the voltage detection terminal 4, thereby reducing the tilting of the voltage detection terminal 4. As a result, the voltage detection terminal 4 and the busbar 3 can be bonded at an appropriate position.

In the fixing structure of voltage detection terminal 1, the pair of the projections 21 are provided in a standing manner such that they lock the upper end side of the flat plate portion 40 on the terminal accommodating portion 20 side in the extending direction. The projections 21 can block the movement in the extending direction of the flat plate portion 40 at a position close to the position where the busbar 3 and the voltage detection terminal 4 are bonded. As a result, the voltage detection terminal 4 and the busbar 3 can be bonded at an appropriate position. The latch projection 22 latches the lower end side of the flat plate portion 40. The latch projection 22 can easily block the movement in the up-down direction of the flat plate portion 40 even when the blocking portion that blocks the movement of the voltage detection terminal 4 cannot be provided at a position close to the position where the busbar 3 and the voltage detection terminal 4 are bonded due to a spatial limitation.

In the fixing structure of voltage detection terminal 1, the pair of the projections 21 are provided in a standing manner such that they guide and fix the upper end side of the flat plate portion 40 on the terminal accommodating portion 20 side in the extending direction, and the latch projection 22 latches the lower end side of the flat plate portion 40. This structure makes it possible for the flat plate portion 40 to be latched to the projections 21 while the latch portion 43 is being latched to the latch projection 22. As a result, fixing the voltage detection terminal 4 to the terminal accommodating portion 20 can be performed in a continuous work.

In the fixing structure of voltage detection terminal 1, the terminal accommodating portion 20 includes the insertion space 20e. The insertion space 20e facilitates the latch of the opening 43a of the latch portion 43 of the flat plate portion 40 to the latch projection 22. As a result, work for fixing the voltage detection terminal 4 to the terminal accommodating portion 20 can be easily performed.

The fixing structure of voltage detection terminal 1 includes the voltage detection terminal 4 and the resin case 2 having insulation property. The voltage detection terminal 4 includes the flat plate portion 40 having a flat plate shape, the busbar connection portion 41 that bends from the upper end in the up-down direction of the flat plate portion 40 in the extending direction perpendicular to the up-down direction and extends in the extending direction, and the crimping portion 42 extending from a lower end side of the flat plate portion 40 in the axial direction perpendicular to the up-down direction and the extending direction, and connected to the end portion of the electrical wire 5. The resin case 2 includes the terminal accommodating portions 20 each of which accommodates the voltage detection terminal 4. The resin case 2 is accommodated in the battery pack to which the metal busbars 3 connecting the electrodes of a plurality of battery cells in series or in parallel are assembled. The busbar connection portion 41 is bonded to a plane surface of the busbar 3 in the up-down direction to overlap with the busbar 3, and is electrically connected to the busbar 3. The terminal accommodating portion 20 includes the projections 21 that block the movement in the extending direction of the flat plate portion 40 of the voltage detection terminal 4 in the terminal accommodating portion 20, and the latch projection 22 that blocks the movement in the up-down direction of the voltage detection terminal 4 in the terminal accommodating portion 20. The pair of projections 21 and the latch projection 22 that are included in the terminal accommodating portion 20, and the latch portion 43 formed on the voltage detection terminal 4 can block the movement of the voltage detection terminal 4 in the up-down direction and the extending direction, i.e., in the planer direction. As a result, this simple structure can block the movement of the voltage detection terminal 4.

In the fixing structure of voltage detection terminal 1, the pair of projections 21 are arranged in a standing manner such that they lock the upper end side of the flat plate portion 40 on the terminal accommodating portion 20 side in the terminal accommodating portion 20. The latch projection 22 is provided in a standing manner in the axial direction and latches the lower end side of the flat plate portion 40. This structure can block the movement in the extending direction of the flat plate portion 40 at a position close to the position where the busbar 3 and the voltage detection terminal 4 are bonded. As a result, the busbar 3 and the voltage detection terminal 4 can be bonded at an appropriate position. This structure can easily block the movement in the up-down direction of the flat plate portion 40 even when the movement of the voltage detection terminal 4 cannot be blocked at a position close to the position where the busbar 3 and the voltage detection terminal 4 are bonded due to a spatial limitation.

In the fixing structure of voltage detection terminal 1, the flat plate portion 40 includes the latch portion 43 having the opening 43a which is opening to the extending direction on the lower end side of the flat plate portion 40. In a state where the opening 43a of the latch portion 43 is latched to the latch projection 22, the inner circumferential surface 43b of the latch portion 43 abuts the outer circumferential surface of the latch projection 22 at least in the up-down direction. The opening 43a of the latch portion 43 abuts the outer circumferential surfaces 22a of the latch projection 22 in the up-down direction, thereby blocking the movement in the up-down direction of the voltage detection terminal 4. As a result, rattling of the voltage detection terminal 4 in the up-down direction can be reduced.

Modification

In the above description, the housing 10 of the battery pack and the resin case 2 are separated. The housing 10 of the battery pack and the resin case 2 may be integrated with each other.

In the above description, the curved surface 21a of the projection 21 is a curved surface. The curved surface 21a of the projection 21 may be a slanted surface.

In the above description, the resin case 2 accommodates the voltage detection terminals 4 the number of which is equal to the number of busbars 3. The number of voltage detection terminals 4 is not limited to the number of busbars 3.

In the above description, the latch projection 22 has a substantially square prism shape. The shape of the latch projection 22 is not limited to the substantially square prism shape. The latch projection 22 may have a substantially triangle prism shape formed such that one side surface out of three side surfaces thereof faces the extending direction, or a cylindrical shape. The shape of the latch portion 43 is not limited to the U-shape (or the reversed C-shape). The latch portion 43 may have a shape fitting with the shape of the latch projection 22.

In the fixing structure of voltage detection terminal according to the embodiment, the terminal accommodating portion includes the first blocking portion that blocks the movement in the extending direction of the flat plate portion of the voltage detection terminal in the terminal accommodating portion, and the second blocking portion that blocks the movement in the up-down direction of the flat plate portion of the voltage detection terminal in the terminal accommodating portion. This simple structure, thus, can reduce the rattling of the voltage detection terminal in the up-down direction even when the voltage detection terminal is bonded to the busbar in the up-down direction, thereby making it possible to block the movement of the voltage detection terminal. This structure blocks the movement of the voltage detection terminal in the extending direction, thereby reducing the tilting of the voltage detection terminal. As a result, the voltage detection terminal and the busbar can be bonded at an appropriate position.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A fixing structure of a voltage detection terminal, comprising:
    a voltage detection terminal that includes:
        a flat plate portion having a flat plate shape and including an upper end and a lower end side spaced apart from each other in an up-down direction of the flat plate;
        an extending portion bending from the upper end of the flat plate portion toward an extending direction that is perpendicular to a main surface of the flat plate portion and is perpendicular to the up-down direction, and protruding along the extending direction, and the extending direction; and
        a connection portion protruding from the lower end side of the flat plate portion toward an axial direction, the axial direction being perpendicular to the up-down direction and the extending direction, and the connection portion is connected to an end portion of a voltage detection electrical wire; and
    a resin case that has insulation property and includes a terminal accommodating portion configured to accommodate the voltage detection terminal, wherein
    the resin case is configured to be accommodated in a housing of a battery pack to which a metal busbar is assembled, the busbar connecting electrodes of a plurality of battery cells in series or in parallel,
    the extending portion is configured to be bonded to a plane surface of the busbar in the up-down direction to overlap with the busbar, and electrically connected to the busbar,
    the terminal accommodating portion includes:
        a first blocking portion configured to block movement of the flat plate portion of the voltage detection terminal in the terminal accommodating portion toward the extending direction; and
        a second blocking portion configured to block movement of the flat plate portion of the voltage detection terminal in the terminal accommodating portion toward the up-down direction, wherein
    the terminal accommodating portion has a back surface along the axial direction and the up-down direction, and side surfaces provided at both sides of the back surface in the axial direction,
    the flat plate portion is disposed between the side surfaces with the extending portion being directed to a side opposite to the back surface,
    the first blocking portion is a pair of projections arranged in a standing manner at the side surfaces respectively such that the projections lock the upper end of the flat plate portion toward the back surface, and
    the second blocking portion is a latch projection that is provided in a standing manner in the axial direction and latches the lower end side of the flat plate portion.

2. The fixing structure of a voltage detection terminal according to claim 1, wherein
    the flat plate portion includes a latch portion having an opening opening to the extending direction on the lower end side, and
    an inner circumferential surface of the latch portion abuts an outer circumferential surface of the latch projection at least in the up-down direction in a state where the opening of the latch portion is latched to the latch projection.

3. A fixing structure of a voltage detection terminal, comprising:
    a voltage detection terminal that includes:
        a flat plate portion having a flat plate shape and including an upper end and a lower end side spaced apart from each other in an up-down direction of the flat plate;
        an extending portion bending from the upper end of the flat plate portion and extending in an extending direction, and the extending direction is perpendicular to the up-down direction; and
        a connection portion extending from the lower end side of the flat plate portion in an axial direction, the axial direction being perpendicular to the up-down direction and the extending direction, and the connection portion is connected to an end portion of a voltage detection electrical wire; and
    a resin case that has insulation property and includes a terminal accommodating portion configured to accommodate the voltage detection terminal, wherein
    the resin case is configured to be accommodated in a housing of a battery pack to which a metal busbar is assembled, the busbar connecting electrodes of a plurality of battery cells in series or in parallel,
    the extending portion is configured to be bonded to a plane surface of the busbar in the up-down direction to overlap with the busbar, and electrically connected to the busbar,
    the terminal accommodating portion includes:
        a first blocking portion configured to block movement of the flat plate portion of the voltage detection terminal in the terminal accommodating portion toward the extending direction; and
        a second blocking portion configured to block movement of the flat plate portion of the voltage detection terminal in the terminal accommodating portion toward the up-down direction,
    the first blocking portion is a pair of projections arranged in a standing manner such that the projections lock the upper end of the flat plate portion on the terminal accommodating portion side in the extending direction,
    the second blocking portion is a latch projection that is provided in a standing manner in the axial direction and latches a lower end side of the flat plate portion, the flat plate portion includes a latch portion having an opening opening to the extending direction on the lower end side, and
    an inner circumferential surface of the latch portion abuts an outer circumferential surface of the latch projection at least in the up-down direction in a state where the opening of the latch portion is latched to the latch projection.

* * * * *